(12) United States Patent
Chatterjee et al.

(10) Patent No.: US 8,498,967 B1
(45) Date of Patent: Jul. 30, 2013

(54) TWO-NODE HIGH AVAILABILITY CLUSTER STORAGE SOLUTION USING AN INTELLIGENT INITIATOR TO AVOID SPLIT BRAIN SYNDROME

(75) Inventors: Paresh Chatterjee, Fremont, CA (US);
Narayanan Balakrishnan, Milpitas, CA (US); Raja Jayaraman, Fremont, CA (US)

(73) Assignee: American Megatrends, Inc., Norcross, GA (US)

( * ) Notice: Subject to any disclaimer, the term of this patent is extended or adjusted under 35 U.S.C. 154(b) by 128 days.

(21) Appl. No.: 12/013,124

(22) Filed: Jan. 11, 2008

Related U.S. Application Data (60) Provisional application No. 60/898,431, filed on Jan. 30, 2007.

(51) Int. Cl.
*G06F 17/30* (2006.01)

(52) U.S. Cl.
USPC ............. 707/674; 707/639; 707/686; 714/4.1

(58) Field of Classification Search
USPC ............ 707/678, 679, 639, 674, 686; 714/4.1
See application file for complete search history.

(56) References Cited

U.S. PATENT DOCUMENTS

| | | | |
|---|---|---|---|
| 4,849,978 A | 7/1989 | Dishon et al. | |
| 4,942,579 A | 7/1990 | Goodlander et al. | |
| 5,257,367 A | 10/1993 | Goodlander et al. | |
| 5,488,716 A * | 1/1996 | Schneider et al. | 714/10 |
| 5,524,204 A | 6/1996 | Verdoorn, Jr. | |
| 5,678,061 A | 10/1997 | Mourad | |
| 5,720,027 A | 2/1998 | Sarkozy et al. | |
| 5,732,238 A | 3/1998 | Sarkozy | |
| 5,787,459 A | 7/1998 | Stallmo et al. | |
| 5,790,774 A | 8/1998 | Sarkozy | |
| 5,893,919 A | 4/1999 | Sarkozy et al. | |
| 5,907,849 A | 5/1999 | Dias et al. | |
| 6,098,128 A | 8/2000 | Velez-McCaskey et al. | |
| 6,105,122 A | 8/2000 | Muller et al. | |
| 6,108,748 A | 8/2000 | Ofek et al. | |
| 6,128,654 A | 10/2000 | Runaldue et al. | |
| 6,151,659 A | 11/2000 | Solomon et al. | |
| 6,173,377 B1 | 1/2001 | Yanai et al. | |
| 6,282,619 B1 | 8/2001 | Islam et al. | |
| 6,289,398 B1 | 9/2001 | Stallmo et al. | |
| 6,502,166 B1 | 12/2002 | Cassidy | |
| 6,591,347 B2 | 7/2003 | Tischler et al. | |

(Continued)

OTHER PUBLICATIONS

U.S. Official Action dated Oct. 5, 2009 in U.S. Appl. No. 11/551,291.

(Continued)

*Primary Examiner* — Mahesh Dwivedi
(74) *Attorney, Agent, or Firm* — Meunier Carlin & Curfman, LLC (57) ABSTRACT

Techniques for maintaining mirrored storage cluster data consistency on systems with two-node, highly available storage solutions can employ an initiator-side agent operable to prevent split-brain scenarios. Split brain syndrome can be avoided, information identifying changes of synchronization states can be maintained, and both graceful and ungraceful shutdowns (or failures) of either one of the nodes or of the intelligent initiator itself can be mitigated. Technology presented herein supports load balancing and hot failover/failback in systems that may feature redundant network connectivity. Moreover, a method is supported for communicating storage cluster status between the storage nodes and the initiator.

18 Claims, 5 Drawing Sheets

U.S. PATENT DOCUMENTS

| | | | |
|---|---|---|---|
| 6,671,705 B1 | 12/2003 | Duprey et al. | |
| 6,785,678 B2 * | 8/2004 | Price | 1/1 |
| 6,826,711 B2 | 11/2004 | Moulton et al. | |
| 7,051,165 B2 | 5/2006 | Kimura et al. | |
| 7,069,385 B2 | 6/2006 | Fujimoto et al. | |
| 7,089,448 B2 | 8/2006 | Hinshaw et al. | |
| 7,155,466 B2 | 12/2006 | Rodriguez et al. | |
| 7,159,150 B2 | 1/2007 | Kenchammana-Hosekote et al. | |
| 7,231,493 B2 | 6/2007 | Nguyen et al. | |
| 7,315,958 B1 | 1/2008 | Bridge, Jr. | |
| 7,398,382 B2 | 7/2008 | Rothman et al. | |
| 7,406,621 B2 | 7/2008 | Lubbers et al. | |
| 7,412,563 B2 | 8/2008 | Subbarao et al. | |
| 7,664,793 B1 * | 2/2010 | Kekre et al. | 707/811 |
| 7,908,448 B1 | 3/2011 | Chatterjee et al. | |
| 7,996,608 B1 * | 8/2011 | Chatterjee et al. | 711/114 |
| 2001/0049771 A1 | 12/2001 | Tischler et al. | |
| 2002/0059540 A1 | 5/2002 | Mann et al. | |
| 2002/0083036 A1 * | 6/2002 | Price | 707/1 |
| 2002/0091746 A1 | 7/2002 | Umberger et al. | |
| 2002/0124139 A1 | 9/2002 | Baek et al. | |
| 2003/0088803 A1 | 5/2003 | Arnott et al. | |
| 2003/0105923 A1 | 6/2003 | Bak et al. | |
| 2003/0126242 A1 | 7/2003 | Chang | |
| 2003/0142561 A1 | 7/2003 | Mason et al. | |
| 2003/0158862 A1 * | 8/2003 | Eshel et al. | 707/200 |
| 2003/0221063 A1 | 11/2003 | Eguchi et al. | |
| 2004/0044865 A1 | 3/2004 | Sicola et al. | |
| 2004/0073831 A1 | 4/2004 | Yanai et al. | |
| 2004/0088483 A1 | 5/2004 | Chatterjee et al. | |
| 2004/0186898 A1 | 9/2004 | Kimura et al. | |
| 2004/0250031 A1 | 12/2004 | Ji et al. | |
| 2004/0255189 A1 | 12/2004 | Chu et al. | |
| 2005/0044346 A1 | 2/2005 | Cronk et al. | |
| 2005/0071389 A1 * | 3/2005 | Gupta | 707/204 |
| 2005/0091391 A1 | 4/2005 | Burton et al. | |
| 2005/0102551 A1 | 5/2005 | Watanabe | |
| 2005/0114350 A1 | 5/2005 | Rose et al. | |
| 2005/0166083 A1 | 7/2005 | Frey, Jr. et al. | |
| 2005/0216538 A1 | 9/2005 | Douceur et al. | |
| 2005/0228942 A1 | 10/2005 | Nichols et al. | |
| 2005/0273565 A1 | 12/2005 | Hirakawa et al. | |
| 2005/0273645 A1 * | 12/2005 | Satran et al. | 714/4 |
| 2005/0283575 A1 | 12/2005 | Kobayashi et al. | |
| 2006/0117212 A1 * | 6/2006 | Meyer et al. | 714/4 |
| 2006/0143432 A1 | 6/2006 | Rothman et al. | |
| 2006/0184731 A1 | 8/2006 | Corbett et al. | |
| 2006/0236064 A1 | 10/2006 | Niles et al. | |
| 2006/0288202 A1 | 12/2006 | Doran et al. | |
| 2007/0174657 A1 | 7/2007 | Ahmadian et al. | |
| 2007/0283348 A1 | 12/2007 | White | |
| 2008/0005612 A1 | 1/2008 | Arai | |
| 2008/0016301 A1 * | 1/2008 | Chen | 711/162 |
| 2008/0046612 A1 * | 2/2008 | Beardsley et al. | 710/52 |
| 2008/0091737 A1 * | 4/2008 | Lee et al. | 707/200 |
| 2008/0104107 A1 | 5/2008 | Schwaab et al. | |
| 2008/0126840 A1 | 5/2008 | Chen et al. | |
| 2008/0270704 A1 | 10/2008 | He et al. | |
| 2009/0037679 A1 | 2/2009 | Kaushik et al. | |
| 2009/0044043 A1 | 2/2009 | Cherian et al. | |

OTHER PUBLICATIONS

U.S. Official Action dated Aug. 17, 2009 in U.S. Appl. No. 11/551,303.
U.S. Official Action dated Jul. 8, 2009 in U.S. Appl. No. 11/551,311.
U.S. Official Action dated Dec. 28, 2009 in U.S. Appl. No. 11/551,311.
U.S. Official Action dated Oct. 14, 2009 in U.S. Appl. No. 11/695,854.
U.S. Official Action dated Dec. 23, 2008 in U.S. Appl. No. 11/551,311.
U.S. Official Action dated Mar. 16, 2009 in U.S. Appl. No. 11/551,303.
U.S. Appl. No. 11/551,291, filed Oct. 20, 2006, entitled "Providing Redundancy in a Storage System", Inventors: Chatterjee et al.
U.S. Appl. No. 11/551,303, filed Oct. 20, 2006, entitled "Background Movement of Data Between Nodes in a Storage Cluster," Inventors: Chatterjee et al.
U.S. Appl. No. 11/551,311, filed Oct. 20, 2006, entitled "Distributed Hot-Spare Storage in a Storage Cluster", Inventors: Chatterjee et al.
U.S. Appl. No. 11/695,854, filed Apr. 3, 2007, entitled "Asynchronous Data Replication", Inventors: Chatterjee et al.
U.S. Official Action dated Mar. 20, 2009 in U.S. Appl. No. 11/551,291.
U.S. Official Action dated Apr. 30, 2009 in U.S. Appl. No. 11/695,854.
Intel "PRO/10 Adapter: Reducing Bottlenecks for Maximum Performance," 2004. URL: http://www.intel.com/support/network/adapter/pro100/sb/cs-010531.htm, 5 pages.
U.S. Official Action dated Jul. 28, 2008 in U.S. Appl. No. 11/551,303.
U.S. Official Action dated Jan. 21, 2011 in U.S. Appl. No. 12/857,050.
Notice of Allowance dated Mar. 28, 2011 in U.S. Appl. No. 11/551,291.
U.S. Official Action dated Jul. 22, 2010 in U.S. Appl. No. 11/551,311.
U.S. Official Action dated Jul. 22, 2011 in U.S. Appl. No. 12/355,439.

* cited by examiner

TWO-NODE HIGH AVAILABILITY CLUSTER STORAGE SOLUTION USING AN INTELLIGENT INITIATOR TO AVOID SPLIT BRAIN SYNDROME

CROSS-REFERENCE TO RELATED APPLICATIONS

This application claims the benefit of U.S. provisional patent application No. 60/898,431, filed on Jan. 30, 2007, and entitled "Two-Node High Availability Cluster Storage Solution Using an Intelligent Initiator to Avoid Split Brain Syndrome" which is expressly incorporated herein by reference in its entirety.

BACKGROUND

Ever increasing requirements for information systems to be available on a nearly constant, non-stop basis have motivated the development of high availability systems. These systems include high availability storage systems. Unfortunately, storage media is a major point of failure in any information system. Traditionally, various methods are employed to reduce the probability of failure and to allow recovery after a storage failure has occurred.

A virtualized cluster is a cluster of different storage nodes that together expose a single storage device. Input/Output operations ("I/Os") sent to the cluster are internally re-routed to read and write data to the appropriate locations. In this regard, a virtualized cluster of storage nodes can be considered analogous to collection of disks in a Redundant Array of Inexpensive Disks ("RAID") configuration, since a virtualized cluster hides the internal details of the cluster's operation from initiators and presents a unified device instead.

In a virtualized cluster, data may also be mirrored between two, or more, storage nodes to provide a redundancy-protected, high availability system. Data can be protected by storing copies in two locations. When two storage nodes are involved, various failures can result in the two nodes losing synchronization with one another. This loss of synchronization can occur in such a way that the two nodes are not able to resolve which one of them has the latest (correct) data. In effect, each node is operating as if it is the other node that has failed. Thus, the two nodes cannot be properly resynchronized. This pathological state may be referred to as a split brain condition, or split brain syndrome. With only two storage nodes in play, there are no additional nodes that can be used to "break the tie" between the conflicting storage nodes. Thus a costly, time consuming, and error prone human intervention may be required to establish a reliable resynchronization between the two storage nodes.

It is with respect to these considerations and others that the disclosure made herein is presented.

SUMMARY

Technologies are described herein for mitigating split brain syndrome in two-node storage clusters using an intelligent initiator module. Through the utilization of the technologies and concepts presented herein, data consistency may be maintained in networked storage environments using one or more intelligent routines within a device specific module (DSM) to mediate lost synchronization between storage nodes. Split brain syndrome can be avoided, information identifying changes of synchronization states can be maintained, and both graceful and ungraceful shutdowns (or failures) of either one of the nodes or of the intelligent initiator itself can be mitigated. Moreover, technology presented herein supports load balancing and hot failover/failback in systems with redundant network connectivity.

According to one aspect presented herein, a DSM within an initiator system can protect against the loss of data consistency between the mirrored nodes caused by network link failure or power outages. The DSM can intelligently break the tie between two storage nodes that have lost synchronization and entered a split brain state. This split brain mitigation can be achieved through information stored by the DSM regarding any changes in state of the storage nodes in the cluster. A functioning mirrored node can maintain a delta list, or change list, recording the accumulated differences between data stored on that node and the data on the unreachable node. This list can be referred to as a tab. The tab can be used to resynchronize the mirrored storage nodes once the failure is recovered. Additionally, the tab may be persisted to disk to protect its contents across local power failures.

According to another aspect, the application of epoch numbers can aid the recovery from synchronization loss between the storage nodes. Epoch numbers can be maintained at each storage node. Communicating epoch numbers between the two storage nodes and/or to the initiator can support reconciling conflicts between storage nodes that have lost synchronization. Communication techniques are supported for relaying storage cluster status between the storage nodes and the initiator.

According to yet another aspect, the DSM can manage load-balancing and hot failover/failback features. The DSM can also mitigate recovery from its own failure through queries to the storage nodes for status information that may have been missed by the DSM.

It should be appreciated that the above-described subject matter may also be implemented as a computer-controlled apparatus, a computer process, a computing system, or as an article of manufacture such as a computer-readable medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

The following detailed description is directed to technologies for maintaining data consistency across two-node high availability storage clusters. Through the use of the embodiments presented herein, data consistency may be maintained in two-node high availability storage clusters using an intelligent agent within an initiator.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

In the following detailed description, references are made to the accompanying drawings that form a part hereof, and which are shown by way of illustration specific embodiments or examples. Referring now to the drawings, in which like numerals represent like elements through the several figures, aspects of a computing system and methodology for mitigating split brain syndrome in two-node high availability storage clusters using an intelligent agent within an initiator will be described.

Figure 1:
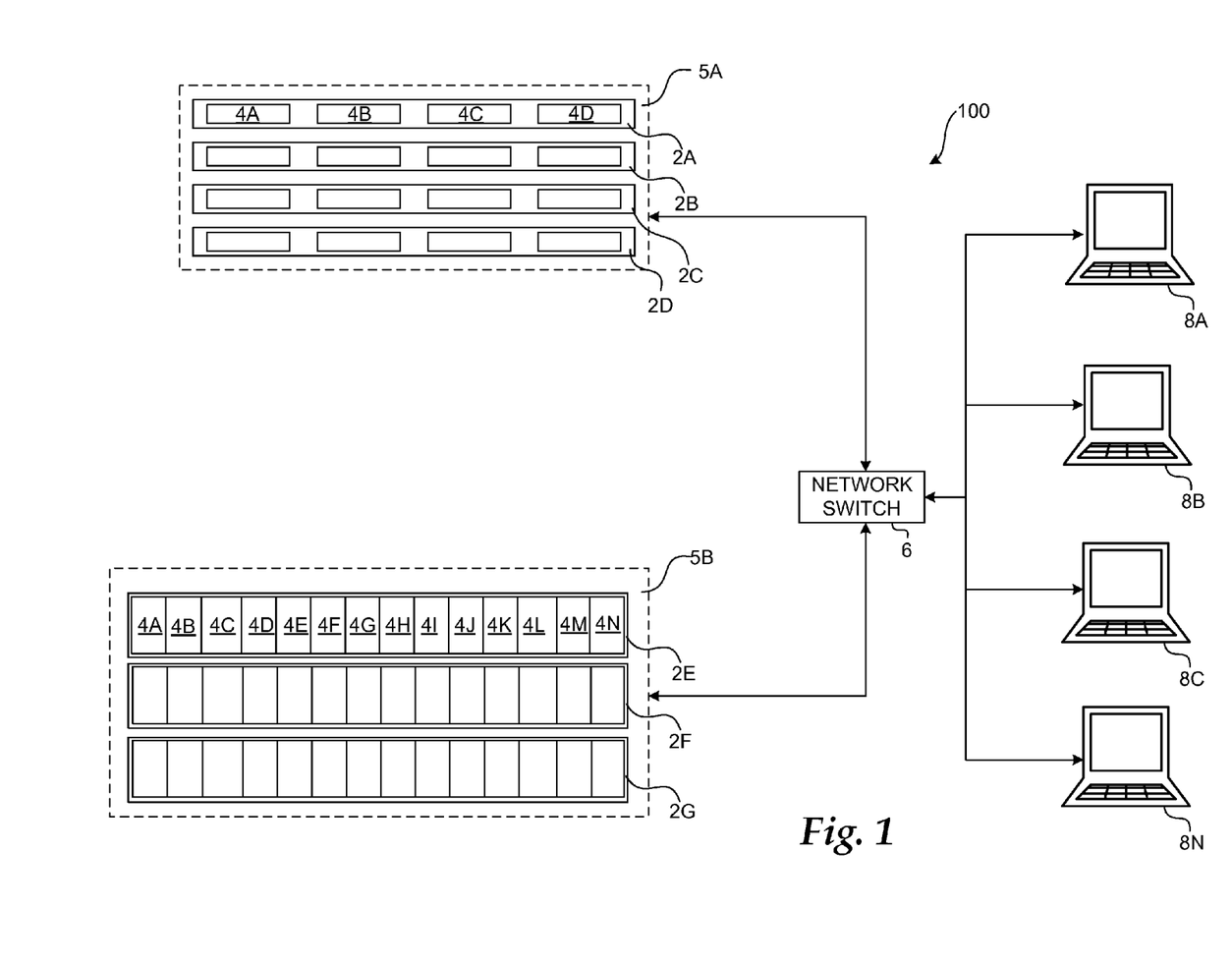
FIG. 1 is a network architecture diagram illustrating aspects of a storage system that includes several virtualized clusters according to one exemplary embodiment.

Turning now to FIG. 1, details will be provided regarding an illustrative operating environment for the implementations presented herein, as well as aspects of several software components that provide the functionality described herein for mitigating split bran scenarios in two-node storage clusters. In particular, FIG. 1 is a network architecture diagram showing aspects of a storage system 100 that includes several virtualized clusters 5A-5B. A virtualized cluster is a cluster of different storage nodes that together expose a single storage device. In the example storage system 100 shown in FIG. 1, the clusters 5A-5B include the storage server computers 2A-2G (also referred to herein as "storage nodes" or a "node") that are operative to read and write data to one or more mass storage devices, such as hard disk drives. The cluster 5A includes the nodes 2A-2D and the cluster 5B includes the nodes 2E-2G. All of the nodes 2 in a cluster 5 can be physically housed in the same rack, located in the same building, or distributed over geographically diverse locations, such as various buildings, cities, or countries.

According to implementations, the nodes within a cluster may be housed in a one rack space unit storing up to four hard disk drives. For instance, the node 2A is a one rack space computing system that includes four hard disk drives 4A-4D. Alternatively, each node may be housed in a three rack space unit storing up to fifteen hard disk drives. For instance, the node 2E includes fourteen hard disk drives 4A-4N. Other types of enclosures may also be utilized that occupy more or fewer rack units and that store fewer or more hard disk drives. In this regard, it should be appreciated that the type of storage enclosure and number of hard disk drives utilized is not generally significant to the implementation of the embodiments described herein. Any type of storage enclosure and virtually any number of hard disk devices or other types of mass storage devices may be utilized.

As shown in FIG. 1, multiple storage nodes may be configured together as a virtualized storage cluster. For instance, the nodes 2A-2D have been configured as a storage cluster 5A and the nodes 2E-2G have been configured as a storage cluster 5B. In this configuration, each of the storage nodes 2A-2G is utilized to field I/O operations independently, but are exposed to the initiator of the I/O operation as a single device. It should be appreciated that a storage cluster may include any number of storage nodes. A virtualized cluster in which each node contains an independent processing unit, and in which each node can field I/Os independently (and route them according to the cluster layout) is called a horizontally virtualized or peer cluster. A cluster in which each node provides storage but the processing and mapping is done completely or primarily in a single node, is called a vertically virtualized cluster.

Data may be striped across the nodes of each storage cluster. For instance, the cluster 5A may stripe data across the storage nodes 2A, 2B, 2C, and 2D. The cluster 5B may similarly stripe data across the storage nodes 2E, 2F, and 2G. Striping data across nodes generally ensures that different I/O operations are fielded by different nodes, thereby utilizing all of the nodes simultaneously, and that the same I/O operation is not split between multiple nodes. Striping the data in this manner provides a boost to random I/O performance without decreasing sequential I/O performance.

According to embodiments, each storage server computer 2A-2G includes one or more network ports operatively connected to a network switch 6 using appropriate network cabling. It should be appreciated that, according to embodiments of the invention, Ethernet or Gigabit Ethernet may be utilized. However, it should also be appreciated that other types of suitable physical connections may be utilized to form a network of which each storage server computer 2A-2G is a part. Through the use of the network ports and other appropriate network cabling and equipment, each node within a cluster is communicatively connected to the other nodes within the cluster. Many different types and number of connections may be made between the nodes of each cluster. Furthermore, each of the storage server computers 2A-2G need not be connected to the same switch 6. The storage server computers 2A-2G can be interconnected by any type of network or communication links, such as a LAN, a WAN, a MAN, a fiber ring, a fiber star, wireless, optical, satellite, or any other network technology, topology, protocol, or combination thereof.

Each cluster 5A-5B is also connected to a network switch 6. The network switch 6 is connected to one or more client computers 8A-8N (also referred to herein as "initiators"). It should be appreciated that other types of networking topologies may be utilized to interconnect the clients and the clusters 5A-5B. It should also be appreciated that the initiators 8A-8N may be connected to the same local area network ("LAN") as the clusters 5A-5B or may be connected to the clusters 5A-5B via a distributed wide area network, such as the Internet. An appropriate protocol, such as the Internet Small Computer Systems Interface ("iSCSI") protocol may be utilized to enable the initiators 8A-8D to communicate with and utilize the various functions of the storage clusters 5A-5B over a wide area network such as the Internet.

Two or more disks 4 within each cluster 5A-5B or across clusters 5A-5B may be mirrored for data redundancy and protection against failure of one, or more, of the disks 4. Examples of the disks 4 may include hard drives, spinning disks, stationary media, non-volatile memories, or optically scanned media; each, or in combination, employing magnetic, capacitive, optical, semiconductor, electrical, quantum, dynamic, static, or any other data storage technology. The disks 4 may use IDE, ATA, SATA, PATA, SCSI, USB, PCI, Firewire, or any other bus, link, connection, protocol, network, controller, or combination thereof for I/O transfers.

Figure 2:
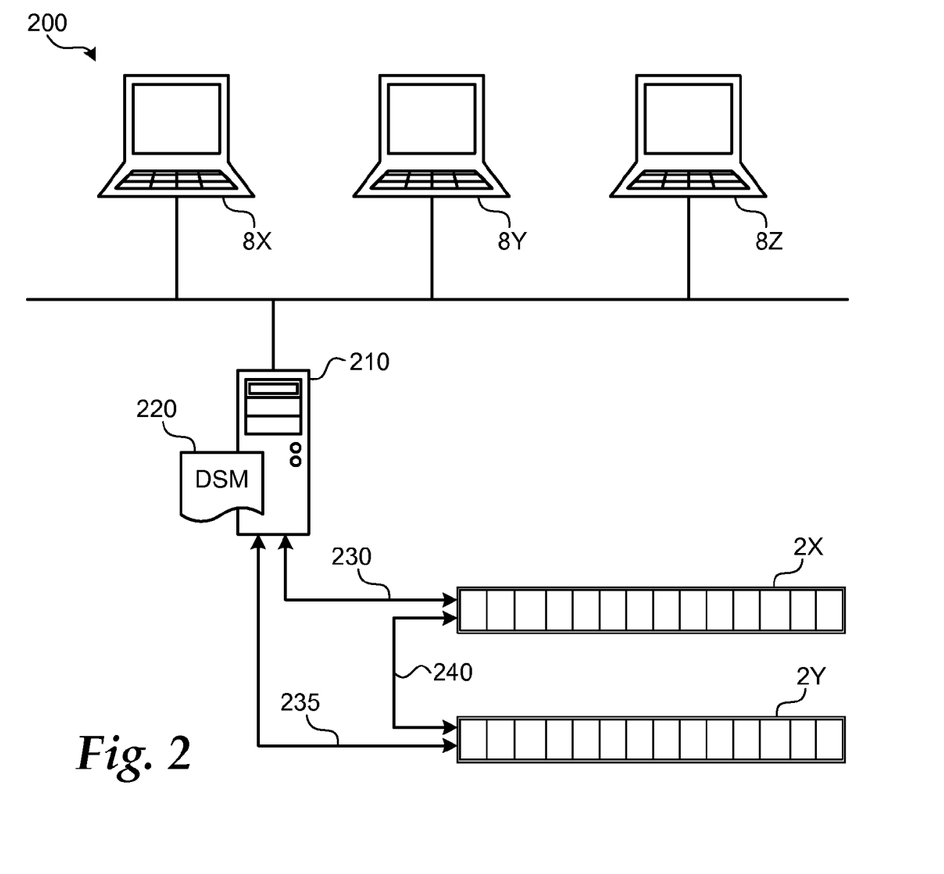
FIG. 2 is a network architecture diagram illustrating aspects of a storage system that includes a two-node storage solution and an application server according to one exemplary embodiment.

Referring now to FIG. 2, a mirrored storage system 200 is illustrated featuring an application server 210 and two storage nodes 2X-2Y. While FIG. 1 illustrates a storage system where client computers 8A-8N are initiators, FIG. 2 illustrates an embodiment where the client computers 8X-8Z can interact with an application server 210. The application server 210 can then itself operate as an initiator to the storage nodes 2X-2Y. Examples application servers 210 may be web servers, mail servers, database servers, etc.

The DSM 220 can be a software module that operates as part of an initiator, such as an application server 210, in order to manage the interface between the initiator 210 and the storage nodes 2X-2Y. The DSM 220 can provide control intelligence for failover, failback, and load balancing operations from the initiator. In a mirrored system, the data on each node 2 is duplicated to the other node 2. Data can be written to a storage node 2 by issuing an I/O request to the node 2. The I/O request is issued by an initiator that can be an application server 210. When data is written to a storage node 2 by the initiator 210, that storage node 2 may be referred to as a primary node 2. The primary node 2 may then mirror the data to the other storage node 2 that can be referred to as the secondary node 2. Again, it is an important operational requirement that data between mirrored nodes 2 be consistent. Because all of the data writes at each of the mirrored volumes 2 may not be instantaneous, or atomic, data inconsistencies may occur due to any one of various pathological scenarios, such as a storage node going down, or a failure on one or more network links.

Data mirroring between the primary storage node and the secondary storage node can take place over a mirror link 240 which can be a network link interconnecting the two store nodes 2X-2Y. The mirror link 240 and the links 230, 235 between the application server 210 and the storage nodes 2X-2Y can each be point-to-point network or communication links, or they can each be part of a network that may include various networking switches 6 and other similar connectivity elements.

Additionally, any of the network links 230, 235, 240 may actually be multiple redundant links. These links may traverse multiple redundant network switches 6. There may also be redundant application servers 210. Such redundancy can be increasingly important in a high availability system.

The DSM 220 can collect status information on the storage network 200. This information can include specific information about each of the storage nodes 2X-2Y. Storage node 2 information may include synchronization status, primary/secondary identification, epoch number, etc. Using state information from the storage nodes 2, the initiator can decide when to perform failover from the primary storage node 2 to the secondary storage node 2. Similarly, failback to the primary storage node 2 after recovery can be supported.

Storage system status information may be used for load balancing between the storage nodes 2 and the initiator 210. During load balancing, read I/Os from the initiator 210 can gain a performance advantage by using multiple network paths available to either or both of the primary and secondary storage nodes 2. Since load balancing may issue read I/Os to both of the storage nodes, such a feature may only be supported when data is fully synchronized between the primary storage node and the secondary storage node.

Storage system status information may also be used for failover between the storage nodes 2. Normally the DSM 220 within the initiator 210 can communicate with the primary storage node 2 and the primary storage node can mirror write I/Os to the secondary storage node 2. If the secondary storage node 2 receives a write I/O directly from the initiator 210 instead of through the primary storage node 2, the secondary storage node 2 may automatically fail over to operate in primary mode. The initiator 210 may only attempt to write directly to the secondary storage node 2 when all connectivity paths to the primary storage node 2 fail, and also the secondary storage node 2 has a current status of being fully synchronized with the primary storage node 2. If data is out-of-sync between the primary and secondary storage nodes 2, then the initiator 210 may not allow failover to the secondary storage node 2.

When a write I/O arrives at the primary storage node 2 but the primary storage node 2 is unable to replicate the write I/O to the secondary storage node 2, the write may be marked at the primary storage node 2 to later be resynchronized to the secondary storage node 2 once the secondary storage node 2 is available. This marking can be recorded in a data structure called a tab. The initiator can be made aware of the loss of synchronization between the two storage nodes 2. With this information, the initiator may elect to not perform any failover activities until data synchronization is reestablished.

According to embodiments, the storage nodes 2 may not be able to initiate communication with an initiator 210. In such a situation, information from the storage nodes 2 may be piggybacked onto the response sent back to the initiator in response to an I/O originally sent by the initiator. For example, the notification that comes from the primary storage node 2 about the status of the cluster can be through a vendor specific check condition. Such a check condition can be piggybacked onto the response to any normal read or write I/O. No additional communication mechanism may be needed to notify the initiator 210 of cluster or node status. The DSM 220 at the initiator 210 can maintain information gathered from both of the storage nodes 2. The DSM 220 can also be responsible for load balancing and triggering failover/failback operations in the cluster. For every path that is connected to the storage node, the DSM 220 can send vendor specific "READ BUFFER" calls to the storage node 2 to collect information associated with the storage nodes 2 and the cluster. The DSM 220 may then store the status of the storage nodes 2 and cluster on disk. This information can be used to decide on the status of the cluster and resolve split brain syndrome.

Depending on the load balancing policy of the system, the DSM 220 can determine the paths that should be used for load balancing. Example policies that may be supported include traditional load balancing (depending on the number of outstanding I/Os on each path), fail-over mode, round robin mode, and others. The policy in use may vary for read I/Os and write I/Os. Policies may also vary according to the storage nodes 2 with which the paths are associated, or a policy can be applied individually for every storage volume within the storage cluster.

An example load balancing policy may attempt to balance the I/Os on each path based on the number of outstanding I/Os on each of those paths. For example, in one case where a storage node 2 is being resynchronized, the read performance from that storage node 2 may be quite low. In such a case, read I/Os can be allocated more heavily along the paths to the other storage node 2, thereby balancing the load on the paths.

Figure 3:
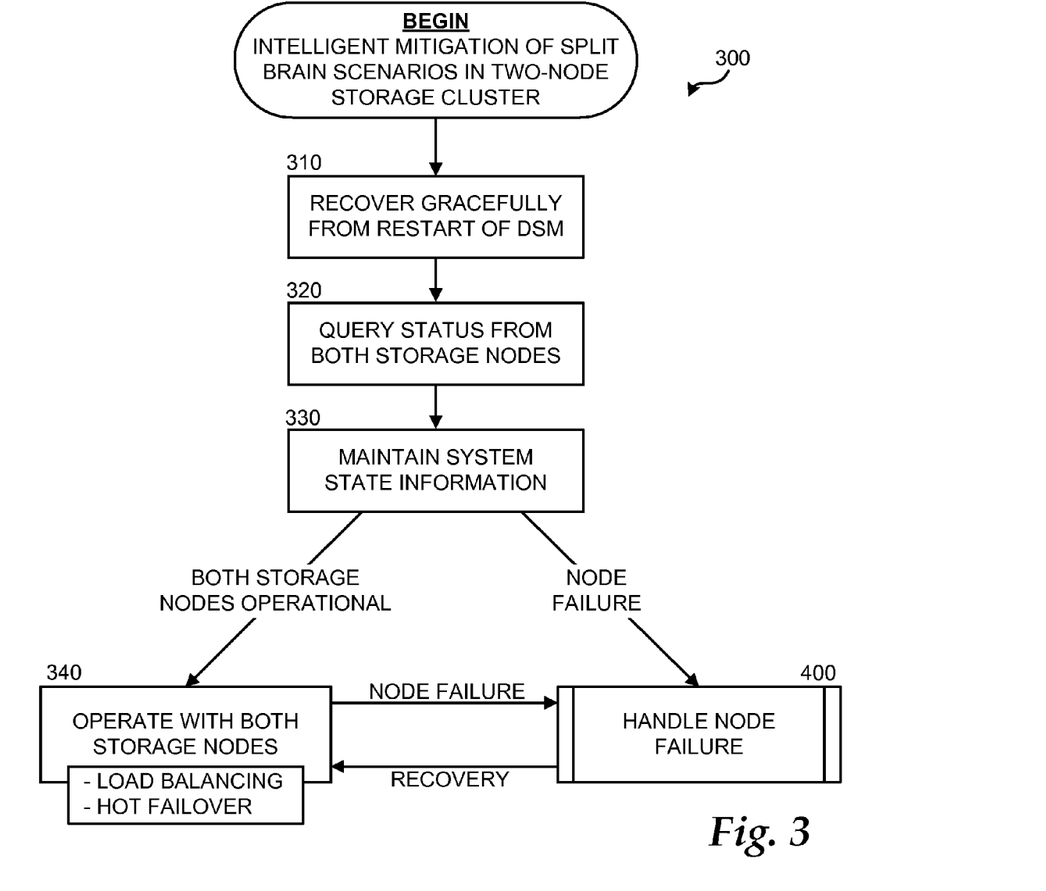
FIG. 3 is a logical flow diagram illustrating a process for intelligent mitigation of split brain scenarios in two-node storage clusters according to one exemplary embodiment.

Referring now to FIG. 3, additional details will be provided regarding the embodiments presented herein for protecting data consistency in two-node storage cluster systems. In particular, FIG. 3 is a flow diagram showing a routine 300 that illustrates aspects of an exemplary process for intelligent mitigation of split brain scenarios in two-node storage clusters. It should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as operations, structural devices, acts, or modules. These operations, structural devices, acts and modules may be implemented in software, in firmware, in special purpose digital logic, and any combination thereof. It should also be appreciated that more or fewer operations may be performed than shown in the figures and described herein. These operations may also be performed in parallel, or in a different order than those described herein.

The routine 300 can begin with operation 310 where the DSM 220 can attempt to gracefully recover from a previous shutdown whenever the DSM 220 starts up. If the DSM was gracefully shut down, status information that was persisted to disk prior to shutdown can be reloaded to being operations of the DSM 220. If the DSM 220 was shut down hard, for example because of a loss of power, the DSM can query the status of the storage nodes 2 and the storage cluster 200 when the DSM returns to operation. Such a query can be issued from the DSM 220 to the storage nodes 2. The DSM 220 can also query this information for any other condition where the stored status information may be out of date at startup. The collected information may include operating modes of the storage nodes 2, which node is primary and which is secondary, the synchronization states of the storage nodes 2, the epoch numbers of the storage nodes 2, and other such status information.

At operation 320, the DSM 220 can query the status of both storage nodes 2. Again, such information may include the operating modes of the storage nodes 2, primary/secondary status of each node 2, the synchronization states of the storage nodes 2, the epoch numbers of the storage nodes 2, and any other such status information. If one of the nodes 2 is unreachable, it can be assumed to be down or it may be verified to be in a failure state by examining information from the operating node 2.

At operation 330, the DSM can maintain the status information of the cluster and the storage nodes 2. This information can be used for various load balancing and failover/failback operations and may also be maintained to disk in order to survive power cycling at the initiator 210.

If both storage nodes 2 are operational, the routine 300 can proceed to operation 340 where the system operates with both storage nodes 2 active. Optionally, the DSM 220 can operate the nodes 2 in a load balancing mode where read I/Os are sent to both of the storage nodes 2 in a distributed fashion in order to balance the load between the two storage nodes. Alternatively, the cluster can be operated in a hot failover mode wherein the secondary node 2 can stand redundantly available to switch into operation should the primary storage node 2 suffer any failure.

If there is a storage node 2 failure, the routine 300 can enter the subroutine 400 for handling node failure. This subroutine 400 is described in further detail with respect to FIG. 4. Once there is a failure recovery and both storage nodes 2 are operational again, the subroutine 400 for handling node failure can return to operation 340.

Figure 4:
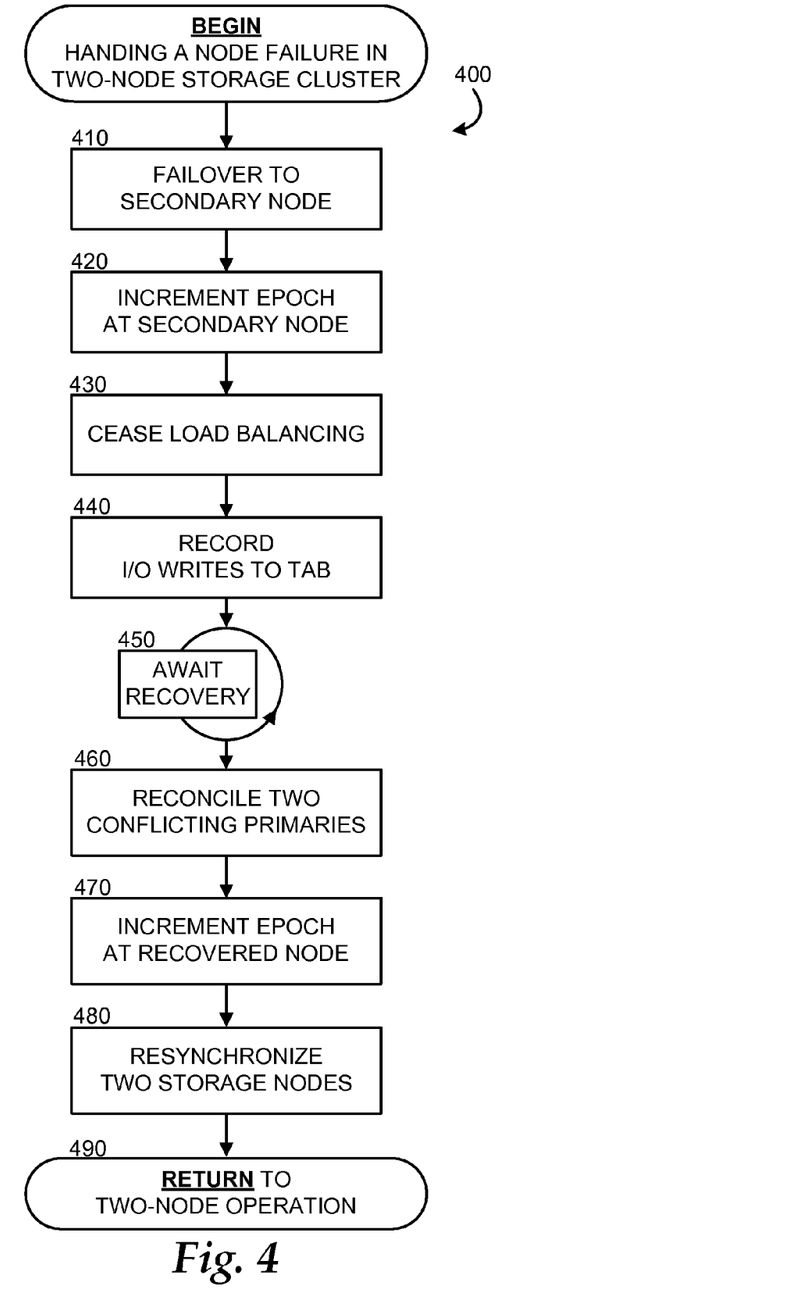
FIG. 4 is a logical flow diagram illustrating a process for handling a node failure in a two-node storage cluster according to one exemplary embodiment.

Turning now to FIG. 4, additional details will be provided regarding the embodiments presented herein for split brain mitigation in two node storage cluster systems. In particular, FIG. 4 is a flow diagram illustrating a routine 400 that shows aspects of an exemplary process for handling a node failure in a two-node storage cluster.

The routine 400 can begin with operation 410 where a failure at the primary storage node 2 can immediately cause the cluster to failover to the secondary storage node 2. Doing so may promote the node that was previously the secondary storage node 2 to become the primary storage node 2. This failover can be performed by the DSM 220 when attempts to access the primary node 2 all fail, the DSM 220 can switch over to accessing the secondary node. Either this action by the DSM 220, or an explicit request can be used to notify the once secondary node 2 that it has been promoted to the primary storage node 2. The DSM 220 can avoid failing over to the second storage node 2, if it is known that the two storage nodes 2 are out of synchronization. This can avoid data inconsistencies within the storage system.

At operation 420, the once secondary storage node 2 that has been newly promoted to the primary storage node 2, can increment its epoch number. This epoch number can be used in reconciling split brain conditions as discussed below.

At operation 430, the DSM 220 can cease load balancing reads to the failed storage node 2. Since one of the storage nodes 2 has failed, the storage nodes 2 are likely to be out of synchronization. As such, read I/Os should not be load balanced across the two storage nodes 2. However, the DSM 2 may still load balance between multiple paths to the node 2 that is operational.

At operation 440, the tab is used in the newly promoted primary storage node 2 to store a record of any write I/Os that are received. This tab is maintained to resynchronize the two storage nodes 2 once the failed node returns to operation.

Operation 450 awaits the recovery of the failed storage node 2. Recovery may involve hardware being replaced, power coming back on line, or connectivity links returning to operation. During the time while recovery of the failed node 2 is awaited, the storage system may be able to fully function using the other operating storage node 2.

Once the failure is recovered, the routine 400 may enter operation 460 where the split brain condition may be resolved. When the original primary node 2 comes back online it may still be in state of the primary node 2. Of course, while it was down, the secondary node 2 may have been promoted to the primary node 2, leaving both storage nodes 2 attempting to operate as the primary node 2. This split brain condition must be reconciled. The promoted node 2 will have incremented its epoch number, while the failed (and now recovered) node 2 may still have the last epoch number. The newly recovered node's lower epoch number can indicate that it is now the secondary node and is likely also out of synchronization. The newly recovered node will thus be demoted to the secondary node.

At operation 470, the newly recovered node 2, which is now the secondary node 2 will increment its epoch number so that both storage nodes 2 will once again have the same epoch number. Finally at operation 480, the two storage nodes 2 will be resynchronized by updating all of the tabbed changes in the primary node 2 into the newly recovered storage node 2. At operation 490, the subroutine 400 can return to routine 300 and transition to operation 340 where two-node operation can take effect. This can include a check condition being sent from the current primary storage node 2 to the DSM 220.

Additionally, if the secondary storage node 2 fails at any time, the primary storage node 2 will not be able to replicate its I/Os to the secondary storage node 2. To prevent allowing the storage system to lose synchronization, the new I/Os can be recorded in a tab. During such a failure, the primary storage node 2 can signal the DSM 220 that the storage system is out of synchronization. With this information, the DSM 220 can elect to not initiate a failover to the secondary storage node 2 should there be a failure in the primary storage node 2. Once the secondary storage node 2 returns to operation, it can be resynchronized from the tabbed I/Os. The primary storage node 2 can then signal the DSM 220 that the system is synchronized. The DSM 220 may then mark the secondary storage node 2 to be ready for failover on any subsequent failure of the primary storage node 2.

Figure 5:
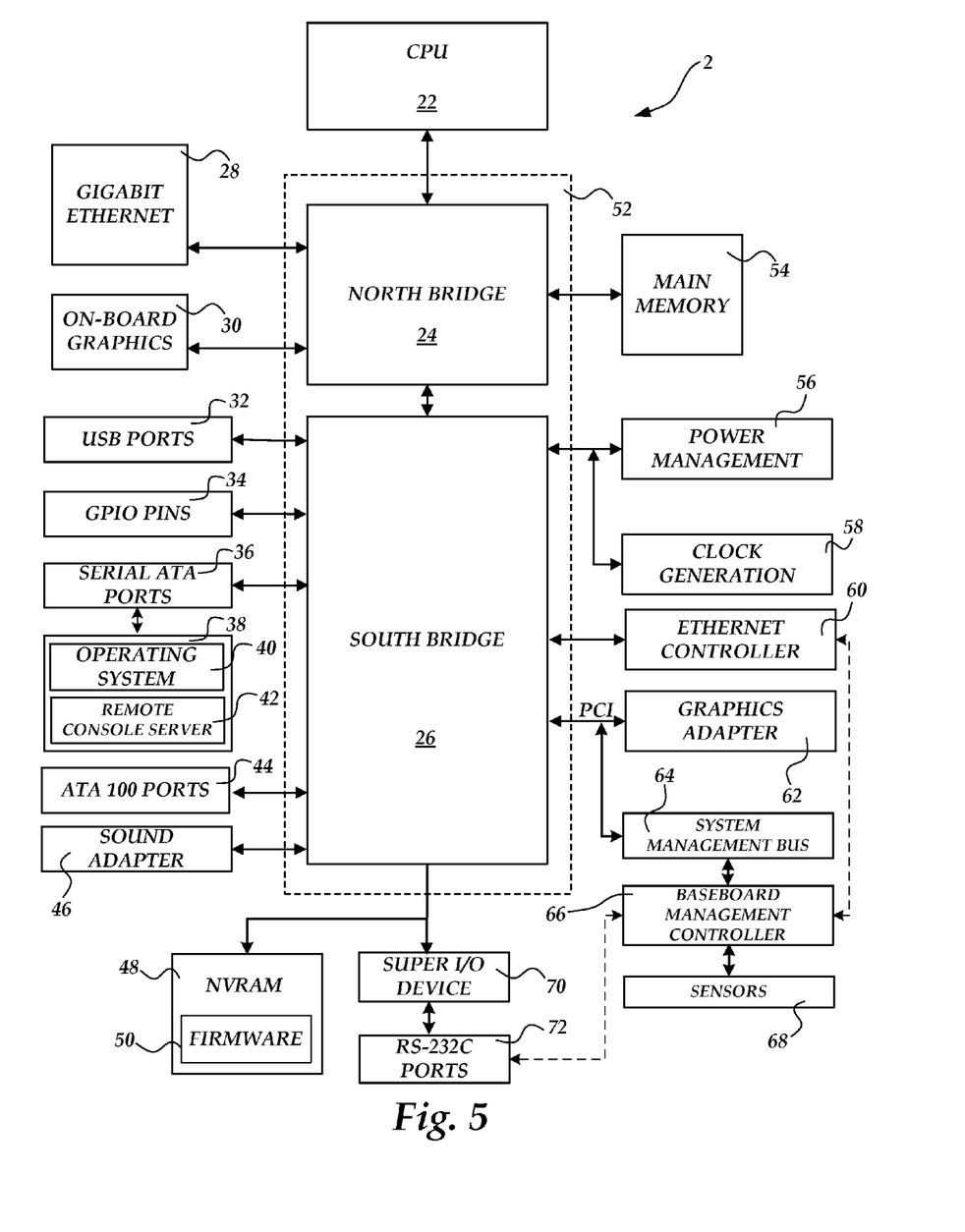
FIG. 5 is a computer architecture diagram illustrating a computer hardware architecture for a computing system capable of serving as a storage node or an initiator according to one exemplary embodiment of the present invention.

FIG. 5 and the following discussion are intended to provide a brief, general description of a suitable computing environment in which the embodiments described herein may be implemented. While the technical details are presented herein in the general context of program modules that execute in conjunction with the execution of an operating system, those skilled in the art will recognize that the embodiments may also be implemented in combination with other program modules.

Generally, program modules include routines, programs, components, data structures, and other types of structures that perform particular tasks or implement particular abstract data types. Moreover, those skilled in the art will appreciate that the embodiments described herein may be practiced with other computer system configurations, including hand-held devices, multiprocessor systems, microprocessor-based or programmable consumer electronics, minicomputers, mainframe computers, and the like. The embodiments described herein may also be practiced in distributed computing environments where tasks are performed by remote processing devices that are linked through a communications network. In a distributed computing environment, program modules may be located in both local and remote memory storage devices.

In particular, FIG. 5 shows an illustrative computer architecture for a storage node computer 2 that may be utilized in the implementations described herein. The storage node computer 2 includes a baseboard, or "motherboard", which is a printed circuit board to which a multitude of components or devices may be connected by way of a system bus or other electrical communication paths. In one illustrative embodiment, a CPU 22 operates in conjunction with a chipset 52. The CPU 22 is a standard central processor that performs arithmetic and logical operations necessary for the operation of the computer. The storage node computer 2 may include a multitude of CPUs 22.

The chipset 52 includes a north bridge 24 and a south bridge 26. The north bridge 24 provides an interface between the CPU 22 and the remainder of the computer 2. The north bridge 24 also provides an interface to a random access memory ("RAM") used as the main memory 54 in the computer 2 and, possibly, to an on-board graphics adapter 30. The north bridge 24 may also include functionality for providing networking functionality through a gigabit Ethernet adapter 28. The gigabit Ethernet adapter 28 is capable of connecting the computer 2 to another computer via a network. Connections which may be made by the network adapter 28 may include LAN or WAN connections. LAN and WAN networking environments are commonplace in offices, enterprise-wide computer networks, intranets, and the internet. The north bridge 24 is connected to the south bridge 26.

The south bridge 26 is responsible for controlling many of the input/output functions of the computer 2. In particular, the south bridge 26 may provide one or more universal serial bus ("USB") ports 32, a sound adapter 46, an Ethernet controller 60, and one or more general purpose input/output ("GPIO") pins 34. The south bridge 26 may also provide a bus for interfacing peripheral card devices such as a graphics adapter 62. In one embodiment, the bus comprises a peripheral component interconnect ("PCI") bus. The south bridge 26 may also provide a system management bus 64 for use in managing the various components of the computer 2. Additional details regarding the operation of the system management bus 64 and its connected components are provided below.

The south bridge 26 is also operative to provide one or more interfaces for connecting mass storage devices to the computer 2. For instance, according to an embodiment, the south bridge 26 includes a serial advanced technology attachment ("SATA") adapter for providing one or more serial ATA ports 36 and an ATA 100 adapter for providing one or more ATA 100 ports 44. The serial ATA ports 36 and the ATA 100 ports 44 may be, in turn, connected to one or more mass storage devices storing an operating system 40 and application programs, such as the SATA disk drive 38. As known to those skilled in the art, an operating system 40 comprises a set of programs that control operations of a computer and allocation of resources. An application program is software that runs on top of the operating system software, or other runtime environment, and uses computer resources to perform application specific tasks desired by the user.

According to one embodiment of the invention, the operating system 40 comprises the LINUX operating system. According to another embodiment of the invention the operating system 40 comprises the WINDOWS SERVER operating system from MICROSOFT CORPORATION. According to another embodiment, the operating system 40 comprises the UNIX or SOLARIS operating system. It should be appreciated that other operating systems may also be utilized.

The mass storage devices connected to the south bridge 26, and their associated computer-readable media, provide non-volatile storage for the computer 2. Although the description of computer-readable media contained herein refers to a mass storage device, such as a hard disk or CD-ROM drive, it should be appreciated by those skilled in the art that computer-readable media can be any available media that can be accessed by the computer 2. By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, DVD, HD-DVD, BLU-RAY, or other optical storage, magnetic cassettes, magnetic tape, magnetic disk storage or other magnetic storage devices, or any other medium which can be used to store the desired information and which can be accessed by the computer.

A low pin count ("LPC") interface may also be provided by the south bridge 6 for connecting a "Super I/O" device 70. The Super I/O device 70 is responsible for providing a number of input/output ports, including a keyboard port, a mouse port, a serial interface 72, a parallel port, and other types of input/output ports. The LPC interface may also connect a computer storage media such as a ROM or a flash memory such as a NVRAM 48 for storing the firmware 50 that includes program code containing the basic routines that help to start up the computer 2 and to transfer information between elements within the computer 2.

As described briefly above, the south bridge 26 may include a system management bus 64. The system management bus 64 may include a BMC 66. In general, the BMC 66 is a microcontroller that monitors operation of the computer system 2. In a more specific embodiment, the BMC 66 monitors health-related aspects associated with the computer system 2, such as, but not limited to, the temperature of one or more components of the computer system 2, speed of rotational components (e.g., spindle motor, CPU Fan, etc.) within the system, the voltage across or applied to one or more components within the system 2, and the available or used capacity of memory devices within the system 2. To accomplish these monitoring functions, the BMC 66 is communicatively connected to one or more components by way of the management bus 64. In an embodiment, these components include sensor devices for measuring various operating and performance-related parameters within the computer system 2. The sensor devices may be either hardware or software based components configured or programmed to measure or detect one or more of the various operating and performance-related parameters. The BMC 66 functions as the master on the management bus 64 in most circumstances, but may also function as either a master or a slave in other circumstances. Each of the various components communicatively connected to the BMC 66 by way of the management bus 64 is addressed using a slave address. The management bus 64 is used by the BMC 66 to request and/or receive various operating and performance-related parameters from one or more components, which are also communicatively connected to the management bus 64.

It should be appreciated that the computer 2 may comprise other types of computing devices, including hand-held computers, embedded computer systems, personal digital assistants, and other types of computing devices known to those skilled in the art. It is also contemplated that the computer 2 may not include all of the components shown in FIG. 5, may include other components that are not explicitly shown in FIG. 5, or may utilize an architecture completely different than that shown in FIG. 5.

Based on the foregoing, it should be appreciated that technologies for intelligent mitigation of split brain scenarios in two-node storage clusters are presented herein. Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. A method for mitigating split brain syndrome in a storage cluster, the method comprising:
    maintaining state information related to a first storage node in a device specific module running on an initiator, the initiator issuing read or write input/output (I/O) commands to the first storage node, and receiving the state information related to the first storage node piggy-backed together with a response to the read or write I/O commands, the state information related to the first storage node comprising an epoch number, a status of synchronization and a status of being a primary node or a secondary node;
    maintaining state information related to a second storage node in the device specific module running on the initiator, the initiator issuing read or write I/O commands to the second storage node, and receiving the state information related to the second storage node piggy-backed together with a response to the read or write I/O commands, the state information related to the second storage node comprising an epoch number, a status of synchronization and a status of being a primary node or a secondary node;
    switching, by the device specific module, operation between the first storage node and the second storage node in response to a failed one of the first storage node and the second storage node;
    reconciling, by the device specific module, state information upon recovery of the failed storage node using the state information in the device specific module, wherein reconciling state information comprises comparing the epoch number related to the first storage node and the epoch number related to the second storage node, wherein the reconciled state information within the first storage node and the second storage node prevents split brain conflicts by designating one of the first storage node and the second storage node as the primary node or the secondary node, respectively; and
    demoting one of the first storage node or the second storage node from the primary node to the secondary node, wherein the demoted first or second storage node has a lower epoch number.

2. The method of claim 1, further comprising maintaining a tab of data writes made to the storage cluster during a period when the failed storage node is in a failed state.

3. The method of claim 2, further comprising resynchronizing the tab of data writes between the first storage node and the second storage node upon recovery of the failed storage node.

4. The method of claim 1, wherein switching operation comprises promoting a secondary node to the primary node.

5. The method of claim 1, further comprising piggybacking state information onto responses provided by the first storage node and the second storage node.

6. A non-transitory computer storage medium having computer-executable instructions stored thereon which, when executed by a computer system, cause the computer system to:
    issue read and write input/output (I/O) commands to read and write data to a first storage node;
    issue read and write I/O commands to read and write data to a second storage node;
    query state information from the first storage node and the second storage node, the state information comprising an epoch number, a status of synchronization and a status of being a primary storage node or a secondary storage node;
    receive the state information related to the first storage node and the second storage node piggy-backed together with a response to the read and write I/O commands;
    maintain queried state information in a device specific module at an initiator;
    failover between the first storage node and the second storage node in response to a failure by using the state information maintained by the device specific module;
    reconcile, at the device specific module, state information upon recovery from the failure wherein reconciling state information comprises comparing the epoch number related to the first storage node and the epoch number related to the second storage node; and demote one of the first storage node or the second storage node from the primary storage node to the secondary storage node upon recovery from the failure, wherein the demoted first or second storage node has a lower epoch number.

7. The non-transitory computer storage medium of claim 6, further comprising causing the computer system to load balance data reads between the first storage node and the second storage node.

8. The non-transitory computer storage medium of claim 6, wherein maintain queried state information comprises persisting queried state information to a disk.

9. The non-transitory computer storage medium of claim 8, further comprising causing the computer system to recover persisted state information from the disk during startup.

10. The non-transitory computer storage medium of claim 6, wherein failover comprises promoting a secondary storage node to a primary storage node.

11. The non-transitory computer storage medium of claim 6, wherein failover comprises incrementing an epoch number.

12. The non-transitory computer storage medium of claim 6, further comprising causing the computer system to piggyback state information onto responses provided by the first storage node and the second storage node.

13. A networked data storage system comprising:
a first storage node;
a second storage node in a mirrored configuration with the first storage node;
an initiator node configured to issue read and write input/output (I/O) commands to read and write data to the first storage node and the second storage node, the initiator node receiving a response to the read and write I/O commands together with state information from the first storage node and the second storage node, the state information comprising an epoch number, a status of synchronization and a status of being a primary node or a secondary node, respectively; and
a device specific module, running on the initiator node, operable to mitigate a split brain scenario related to the first storage node and the second storage node in accordance with the state information, wherein the initiator node, using the device specific module, operates to reconcile state information upon recovery from a failure, wherein reconciling state information comprises comparing the epoch number related to the first storage node and the epoch number related to the second storage node, wherein the initiator node, using the device specific module, operates to mitigate the split brain scenario using state information associated with the first storage node and the second storage node gathered during input/output (I/O) operations, wherein the initiator node, using the device specific module, designates one of the first storage node and the second storage node as the primary node or the secondary node, respectively, and wherein the initiator node, using the device specific module, operates to demote one of the first storage node or the second storage node from the primary node to the secondary node, wherein the demoted first or second storage node has a lower epoch number.

14. The networked data storage system of claim 13, wherein the device specific module is further operable to query state information related to the first storage node and the second storage node.

15. The networked data storage system of claim 13, wherein the device specific module is further operable to failover between the first storage node and the second storage node.

16. The networked data storage system of claim 13, wherein the device specific module is further operable to load balance between the first storage node and the second storage node.

17. The networked data storage system of claim 14, wherein the device specific module is further operable to persist state information for use after a restart of the device specific module.

18. The networked data storage system of claim 13, wherein the device specific module is further operable to piggyback state information onto responses provided by the first storage node and the second storage node.

* * * * *